(12) United States Patent
Basu Mallick et al.

(10) Patent No.: US 11,382,117 B2
(45) Date of Patent: Jul. 5, 2022

(54) DETERMINING UPLINK GRANTS FOR MULTIPLE MODES

(71) Applicant: LENOVO (BEIJING) LIMITED, Beijing (CN)

(72) Inventors: Prateek Basu Mallick, Oberursel (DE); Karthikeyan Ganesan, Kaiserslautern (DE); Joachim Loehr, Wiesbaden (DE); Jing Han, Beijing (CN); Lianhai Wu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 62 days.

(21) Appl. No.: 16/961,393

(22) PCT Filed: Jul. 12, 2019

(86) PCT No.: PCT/CN2019/095866
§ 371 (c)(1),
(2) Date: Jul. 10, 2020

(87) PCT Pub. No.: WO2021/007723
PCT Pub. Date: Jan. 21, 2021

(65) Prior Publication Data
US 2022/0007390 A1    Jan. 6, 2022

(51) Int. Cl.
*H04W 72/12* (2009.01)
*H04W 28/02* (2009.01)
*H04W 72/14* (2009.01)

(52) U.S. Cl.
CPC ... *H04W 72/1268* (2013.01); *H04W 28/0278* (2013.01); *H04W 72/14* (2013.01)

(58) Field of Classification Search
CPC ......... H04W 72/1268; H04W 28/0278; H04W 72/14; H04W 72/1284; H04W 74/004
See application file for complete search history.

(56) References Cited

U.S. PATENT DOCUMENTS

2018/0092125 A1*  3/2018  Sun ................... H04W 74/02
2018/0176945 A1*  6/2018  Cao ................. H04W 72/1268
(Continued)

FOREIGN PATENT DOCUMENTS

| CN | 104832177 A | 8/2015 |
|---|---|---|
| CN | 107222827 A | 9/2017 |
| CN | 109479315 A | 3/2019 |

OTHER PUBLICATIONS

International Searching Authority, Written Opinion of the International Searching Authority, PCT, dated Apr. 13, 2010, pp. 1-3.
(Continued)

*Primary Examiner* — Dinh Nguyen
(74) *Attorney, Agent, or Firm* — Kunzler Bean & Adamson

(57) ABSTRACT

Apparatuses, methods, and systems are disclosed for determining uplink grants for multiple modes. One method (600) includes determining (602), over a first time period, a first mode uplink grant corresponding to a first mode. Determining the first mode uplink grant comprises receiving the first mode uplink grant. The method (600) includes determining (604) autonomously, over a second time period, a second mode uplink grant corresponding to a second mode. The second mode is different from the first mode. The method (600) includes using (606) the first mode uplink grant and the second mode uplink grant to transmit data based on an uplink grant availability corresponding to the first mode uplink grant and the second mode uplink grant.

20 Claims, 6 Drawing Sheets

(56) References Cited

U.S. PATENT DOCUMENTS

| | | | | |
|---|---|---|---|---|
| 2018/0270698 A1* | 9/2018 | Babaei | ............. | H04W 24/08 |
| 2018/0270839 A1* | 9/2018 | Loehr | ............. | H04W 72/14 |
| 2018/0368159 A1 | 12/2018 | Wu | | |
| 2019/0166609 A1* | 5/2019 | Xu | ............. | H04W 72/1268 |
| 2019/0320431 A1* | 10/2019 | Huang | ............. | H04W 72/14 |
| 2020/0037345 A1* | 1/2020 | Ryoo | ............. | H04W 76/10 |
| 2020/0059821 A1* | 2/2020 | Wirth | ............. | H04L 1/1851 |

OTHER PUBLICATIONS

International Searching Authority, International Search Report, Patent Cooperation Treaty, date of completion of the international search: Apr. 13, 2020, pp. 1-3.

Potevio, Details of LCP for enhanced SPS configurations, 3GPP TSG RAN WG2 Meeting #96, R2-167998, Nov. 14-18, 2016, Reno, USA, pp. 1-3.

3GPP, 3rd Generation Partnership Project; Technical Specification Group Radio Access Network; NR; Medium Access Control (MAC) protocol specification (Release 15), 3GPP TS 38.321 V15.6.0, Jun. 2019, pp. 1-78.

* cited by examiner

DETERMINING UPLINK GRANTS FOR MULTIPLE MODES

FIELD

The subject matter disclosed herein relaxes generally to wireless communications and more particularly relates to determining uplink grants for multiple modes.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Backhaul ("BH"), Broadcast Multicast ("BM"), Buffer Occupancy ("BO"), Base Station ("BS"), Basic Safety Message ("BSM"), Buffer Status Report. ("BSR"), Bandwidth ("BW"), Bandwidth Part ("BWP"), Cooperative Awareness Message ("CAM"), Channel Busy Ratio ("CBR"), Component Carrier ("CC"), Common Control Channel ("CCCH"), Code Division Multiplexing ("CDM"), Control Element ("CE"), Coordinated Multipoint ("CoMP"), Categories of Requirements ("CoR"), Control Resource Set ("CORESET"), Control Plane ("CP"), CSI-RS Resource Indicator ("CRI"), Cell RNTI ("C-RNTI"), Channel State Information ("CSI"), CSI IM ("CSI-IM"), CSI RS ("CSI-RS"), Channel Quality Indicator ("CQI"), Central Unit ("CU"), Codeword ("CW"), Downlink Assignment Index ("DAI"), Dedicated Control Channel ("DCCH"), Downlink Control Information ("DCI"), Decentralized Environment Notification ("DENM"), Downlink ("DL"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), 450 MHz-6000 MHz ("FR1"), 24250 MHz-52600 MHz ("FR2"), Hybrid Automatic Repeat Request ("HARQ"), Integrated Access Backhaul ("IAB"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 or Layer 1 ("L1"), L1 SINR ("L1-SINR"), Level 2 or Layer 2 ("L2"), Logical Channel ("LCH"), Logical Channel Group ("LCG"), Logical Channel ID ("LCID"), Logical Channel Prioritization ("LCP"), Long Term Evolution ("LTE"), Levels of Automation ("LoA"), Mode 1 and Mode 2 ("M1M2"), Medium Access Control ("MAC"), Modulation Coding Scheme ("MCS"), Multiple Input Multiple Output ("MIMO"), Mobile-Termination ("MT"), Machine Type Communication ("MTC"), Multi-User ("MU"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), NZP CSI-RS ("NZP-CSI-RS"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), UE to UE Interface ("PC5"), Policy Control Function ("PCF"), Packet Delay Budget ("PDB"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), PC5 QoS Class Identifier ("PQI"), Physical Resource Block ("PRB"), Packet Switched ("PS"), Physical Si delink Control Channel ("PSCCH"), Physical Sidelink Shared Channel ("PSSCH"), Phase Tracking RS ("PTRS" or "PTRS"), Physical Uplink Shared Channel ("PUSCH"), Quasi Co-Located ("QCL"), Quality of Service ("QoS"), Random Access Channel ("RACK"), Radio Access Network ("RAN"), Radio Access Technology ("RAT"), Resource Element ("RE"), Rank Indicator ("RI"), Radio Link Control ("RLC"), Radio Link Failure ("RLF"), Radio Network ("RN"), Radio Network Temporary Identifier ("RNTI"), Resource Pool ("RP"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Sub Carrier Spacing ("SCS"), Service Data Unit ("SDU"), Subscriber Identity Module ("SIM"), Signal-to-Interference Ratio ("SINR"), Sidelink ("SL"), Sequence Number ("SN"), Scheduling Request ("SR"), SRS Resource Indicator ("SRI"), Sounding Reference Signal ("SRS"), Synchronization Signal ("SS"), SS/PBCH Block ("SSB"). Transport Block ("TB"), Transmission Control Information ("TCI"), Time Division Duplex ("TDD"), Temporary Mobile Subscriber Identity ("TMSI"), Transmitted Preceding Matrix Indicator ("TPMI"), Transmission Reception Point ("TRP"), Transmit ("TX"), User Entity/Equipment (Mobile Terminal) ("UE"). Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Cellular Interface ("Uu"), Vehicle to Everything ("V2X"), Voice Over IP ("VoIP"), Visited Public Land Mobile Network ("VPLMN"), Vehicular QoS Class Identifier ("VQI"), Vehicle RNTI ("V-RNTI"), Worldwide Interoperability for Microwave Access ("WiMAX"), Zero Power ("ZP"), and ZP CSI-RS ("ZP-CSI-RS"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, multiple modes may be used. In such networks, data may be transmitted using one or more of the multiple modes.

BRIEF SUMMARY

Methods for determining uplink grants for multiple modes are disclosed. Apparatuses and systems also perform the functions of the apparatus. In one embodiment, the method includes determining, over a first time period, a first mode uplink grant corresponding to a first mode. In such an embodiment, determining the first mode uplink grant comprises receiving the first mode uplink grant. In certain embodiments, the method includes determining autonomously, over a second time period, a second mode uplink grant corresponding to a second mode. In such embodiments, the second mode is different from the first mode. In various embodiments, the method includes using the first mode uplink grant and the second mode uplink grant to transmit data based on an uplink grant availability corresponding to the first mode uplink grant and the second mode uplink grant.

An apparatus for determining uplink grants for multiple modes, in one embodiment, includes a processor that: determines, over a first time period, a first mode uplink grant corresponding to a first mode, wherein determining the first mode uplink grant comprises receiving the first mode uplink grant; and determines autonomously, over a second time period, a second mode uplink grant corresponding to a second mode, wherein the second mode is different from the first mode. In some embodiments, the apparatus includes a transmitter that uses the first mode uplink grant and the second mode uplink grant to transmit data based on an uplink grant availability corresponding to the first mode uplink grant and the second mode uplink grant.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
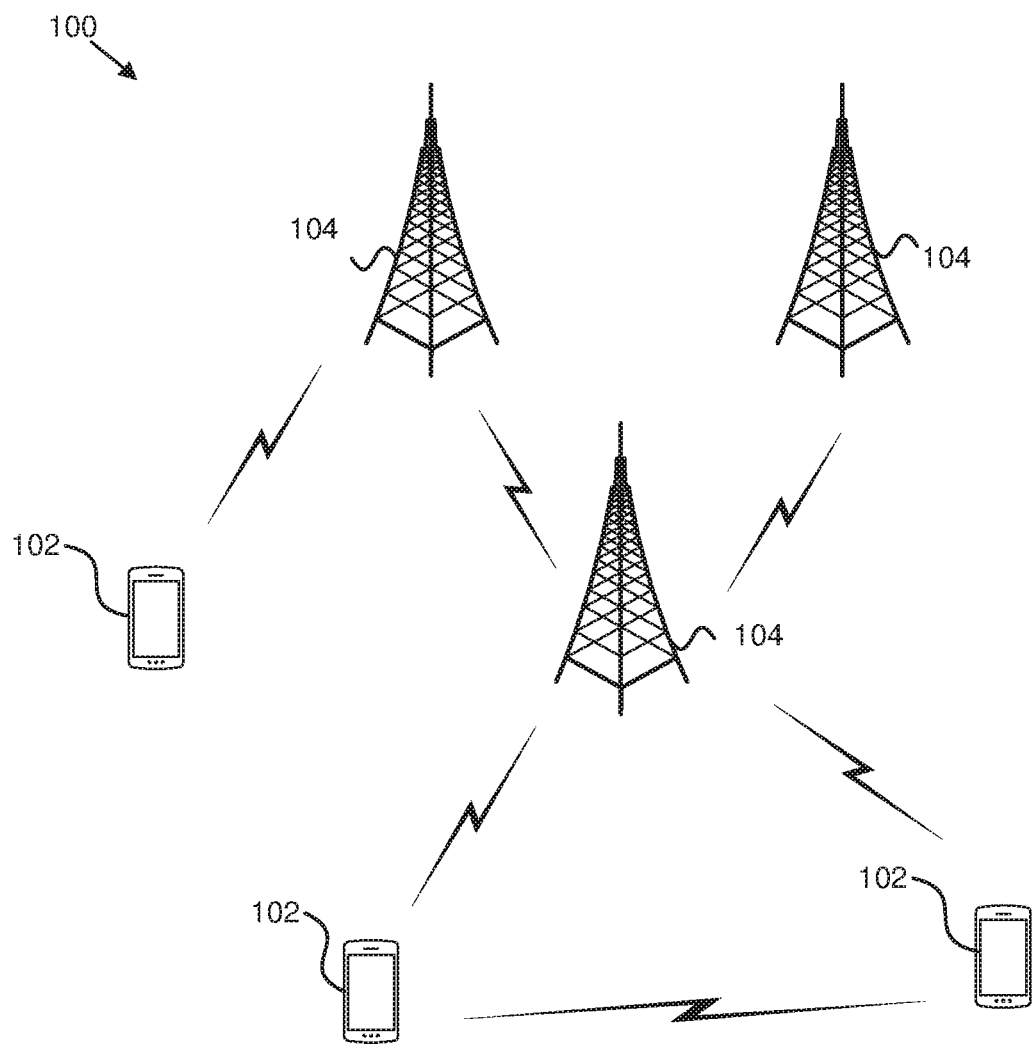
FIG. 1 is a schematic block diagram illustrating one embodiment of a wireless communication system for determining uplink grants for multiple modes.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array-logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wares, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flow-chart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining uplink grants for multiple nodes. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In some embodiments, a remote unit 102 may determine, over a first time period, a first mode uplink grant corresponding to a first mode. In such embodiments, determining the first mode uplink grant comprises receiving the first mode uplink grant. In certain embodiments, the remote unit 102 may determine autonomously, over a second time period, a second mode uplink grant corresponding to a second mode. In such embodiments, the second mode is different from the first mode. In various embodiments, the remote unit 102 may use the first mode uplink grant and the second mode uplink grant to transmit data based on an uplink grant availability corresponding to the first mode uplink grant and the second mode uplink grant. Accordingly, a remote unit 102 may be used for determining uplink grants for multiple modes.

Figure 2:
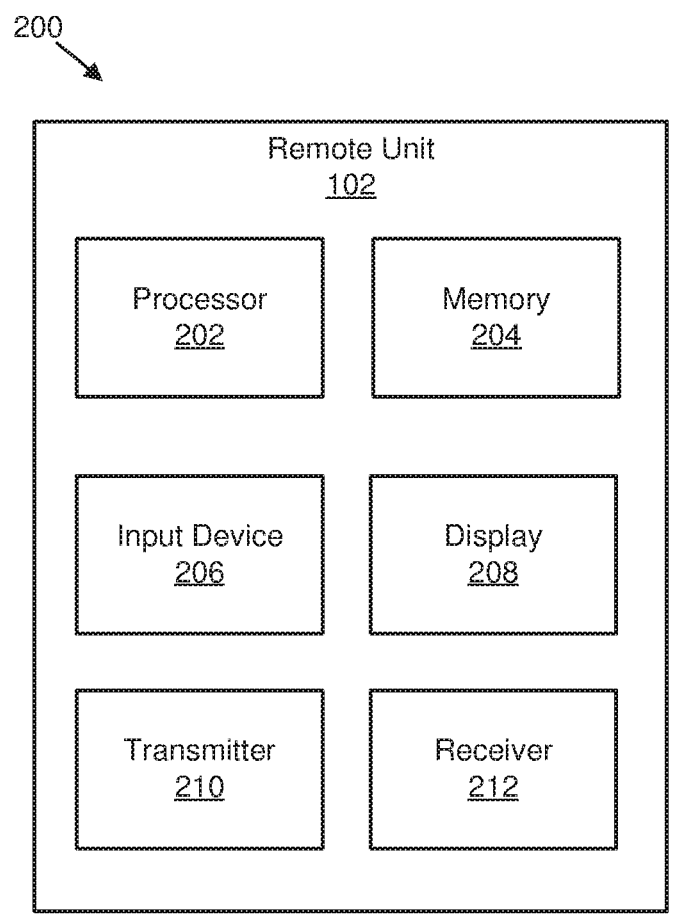
FIG. 2 is a schematic block diagram illustrating one embodiment of an apparatus that may be used for determining uplink grants for multiple modes.

FIG. 2 depicts one embodiment of an apparatus 200 that may be used for determining uplink grains for multiple modes. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the processor 202: determines, over a first time period, a first mode uplink grant corresponding to a first mode, wherein determining the first mode uplink grant comprises receiving the first mode uplink grant; and determines autonomously, over a second time period, a second mode uplink grant corresponding to a second mode, wherein the second mode is different from the first mode. In certain embodiments, the transmitter 210 uses the first mode uplink grant and the second mode uplink grant to transmit data based on an uplink grant availability corresponding to the first mode uplink grant and the second mode uplink grant.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
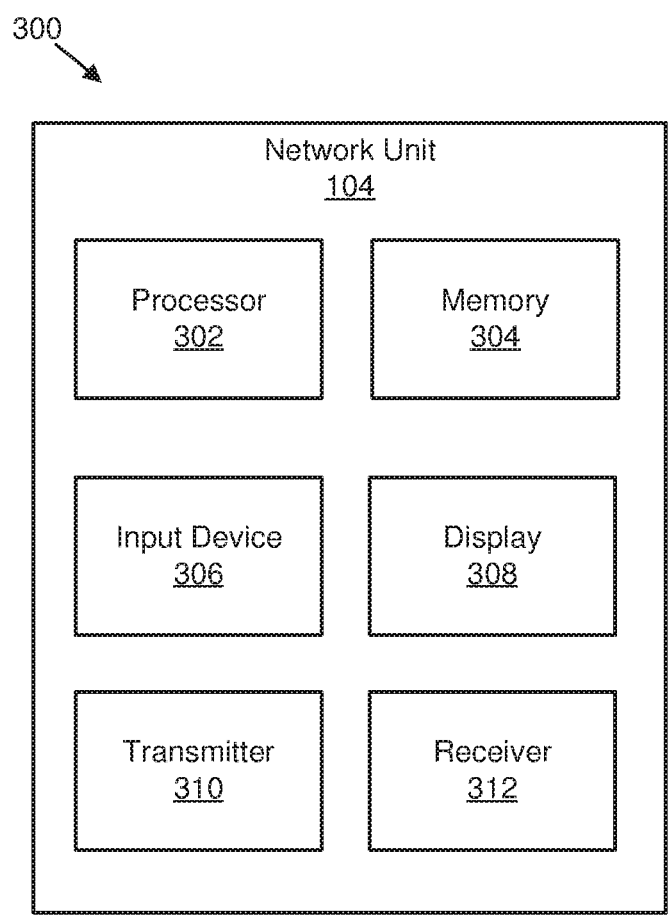
FIG. 3 is a schematic block diagram illustrating one embodiment of an apparatus that may be used for receiving data.

FIG. 3 depicts one embodiment of an apparatus 300 that may be used for receiving data. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially Similar to the processor 202, the memory 204, the input device 206, the display 208, the transmitter 210, and the receiver 212 of the remote unit 102, respectively.

In various embodiments, the receiver 312 receives data from the remote unit 102. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, there are two resource allocation modes for LTE that are referred to as Mode 3 and Mode 4; and there are two resource allocation modes for NR that are referred as Mode 1 and Mode 2. All of Modes 1, 2, 3, and 4 support, direct V2X communications but differ on how radio resources are allocated. In various embodiments, a cellular network allocates Mode 1 and Mode 3 resources (e.g., a gNB allocates Mode 1 resources and an eNB allocates Mode 3 resources). In some embodiments, Mode 2 and Mode 4 do not require cellular coverage and corresponding radio resources are autonomously determined (e.g., by a remote unit 102, such as a UE, a vehicle, etc.). In certain embodiments, a remote unit 102 autonomously determines the radio resources using a distributed scheduling scheme supported by congestion control mechanisms from preconfigured resource pools. In various embodiments, a RAN (e.g., for in-coverage UEs) may also allocate Mode 2 and Mode 4 resources.

In some embodiments, a V2X UE may only use one Mode for its transmission at any point in time (e.g., either Mode 1 or Mode 2), while in other embodiments a V2X UE may use more than one Mode simultaneously such as to cater to different requirements of V2X applications, to increase system (e.g., radio resource) efficiency, and/or to increase diversity.

To facilitate using more than one Mode simultaneously, logical channels for V2X si del ink communication may be configured accordingly. In certain embodiments, a RN configures mode restriction for each SL LCH. The logical channels are configured, with either Mode 1 or Mode 2 transmission. The UE then considers only the LCHs with Mode 1 transmission for its BSR and therefore data in the other LCHs are completely ignored from BSR triggering & reporting procedures. In various embodiments, the RN configures some of logical channels with both Mode 1 and Mode 2 transmission (e.g., M1M2 or no particular mode restriction). Data from these logical channels may be transmitted using Mode 1 as well as using Mode 2. In some embodiments, a RN may configure a preferred mode for M1M2 LCHs. In such embodiments, a UE may maximize data transmission of this particular logical channel using Mode 1 resources only if the Mode 1 is configured as the preferred mode. Similarly, Mode 2 may be configured as a preferred mode of transmission for a M1M2 LCH. Furthermore, for an M1M2 LCH, a UE may transmit using a non-preferred mode if the channel for the preferred mode is congested, or in poor radio condition (e.g. if Uu is in a poor radio condition for Mode 1, or Mode 2 resource pool is congested).

In one embodiment, a RN configures mode restrictions for each SL LCH. In such an embodiment, some logical channels may be configured for both Mode 1 and Mode 2 transmission (e.g., M1M2). Data from these logical channels may be transmitted using Mode 1 as well as using Mode 2. A UE may initiate resource acquisition for data transmission of a particular M1M2 configured logical channel using both Mode 1 and Mode 2 resources. Therefore, whenever data becomes available for transmission in a layer 2 buffer (e.g., PDCP, RLC, MAC) of this logical channel, the UE may: start a Mode 2 sensing procedure (or otherwise autonomously determine an uplink grant (or available transmission resources) for Mode 2), if not already started and look for a Mode 2 UL grant; and send a scheduling request to a network device 104 (e.g., using a dedicated scheduling request if configured, by initiating a RACH procedure, or by sending a SL BSR if an Mode 1 UL grant is already available) such as if no Mode 1 resources for transmission are already available.

In some embodiments, for the actual transmission of data, the UE may use either a Mode 1 UL grant or a Mode 2 UL grant based on which UL grant is available earlier in time to transmit the data (e.g., the UL grant that will transmit the data the soonest and/or the fastest, or the UL grant that is determined as a first UL grant and is determined before a second UL grant). In certain embodiments, the later UL grant (e.g., the UL grant that will not transmit the data the soonest and/or the fastest, or the UL grant that is determined as the second UL grant that is determined after the first UL grant) may be returned back to the system (e.g., using a physical level signaling for a Mode 1 UL grant, or providing an indication indicating that the resources are unreserved via SCI signaling for a Mode 2 UL grant). In various embodiments, the later grant may be used for retransmission of the data with or without waiting for HARQ feedback from receiver UEs.

Figure 4:
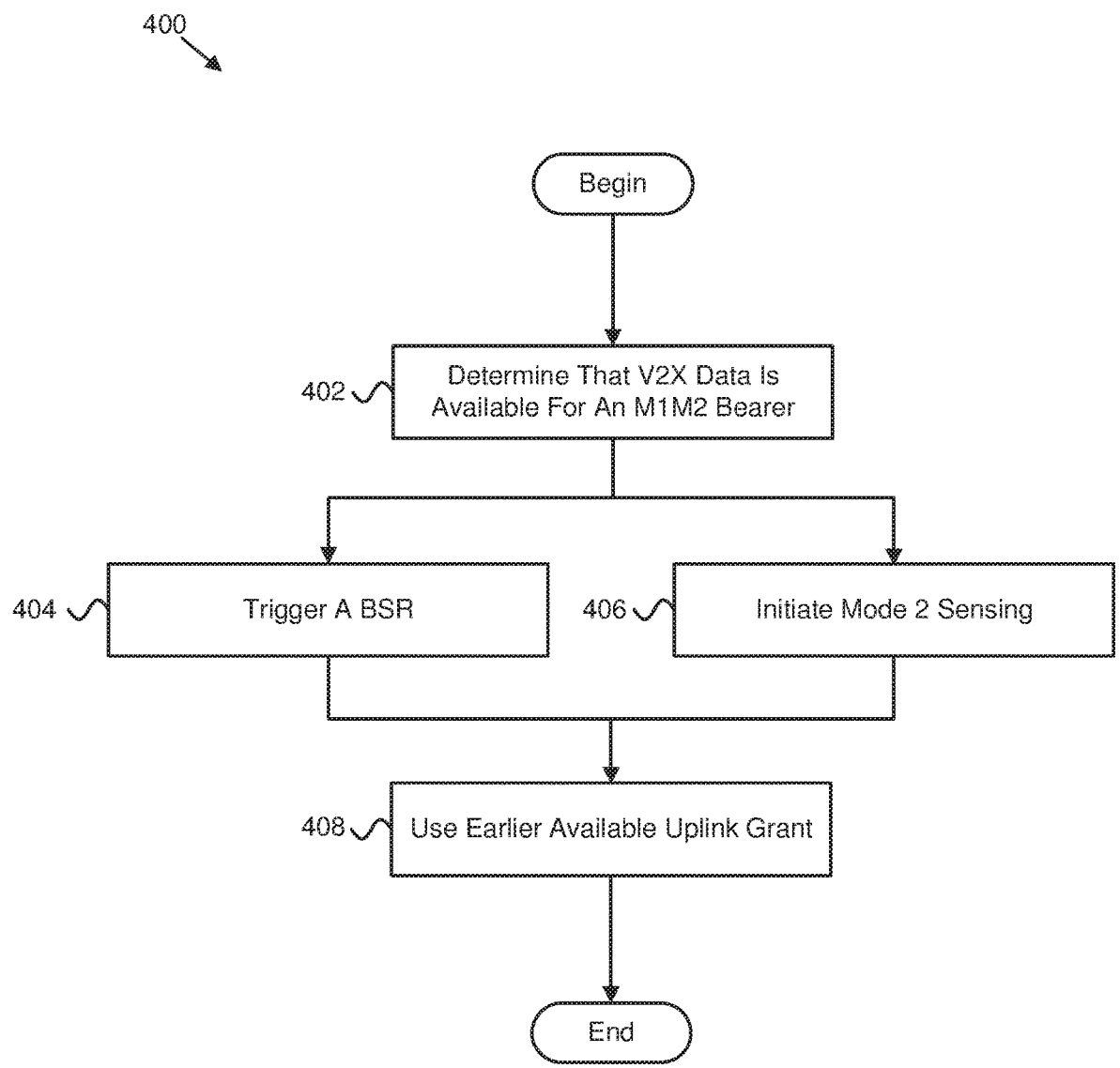
FIG. 4 is a schematic flow chart diagram illustrating one embodiment of a method for determining uplink grants for multiple modes.

FIG. 4 is a schematic flow chart diagram illustrating one embodiment of a method 400 for determining uplink grants for multiple modes. The method 400 may be performed by a remote unit 102 (e.g., UE). In the illustrated embodiment, the method 400 determines 402 that V2X data is available (e.g., for transmission) for an M1M2 bearer, Tire method 400 then concurrently triggers 404 a BSR (or otherwise determines a Mode 1 UL grant, such as by determining that a Mode 1 UL grant is already received) and initiates 406 Mode 2 sensing (or otherwise determines a Mode 2 UL grant, such as by randomly selecting UL resources) in response to data becoming available for the M1M2 bearer. The method 400 then uses 408 the earlier available uplink grant. Accordingly, as shown in FIG. 4, a UE initiates resource acquisition for both Mode 1 and 2, but transmits using the earlier available UL grant.

In certain embodiments, a UE determines how much data is to be transmitted for each mode, calculates a buffer status based on the UE determination, and reports the buffer status.

In one embodiment, for Mode 1, the following formula may be used: [sum of BO of all LCHs restricted to Mode 1 transmission]+[sum of ((BO of the $i^{th}$ M1M2 LCH)*(Mode 1 ratio for the $i^{th}$ M1M2 LCH))].

In another embodiment, for Mode 2, the following formula may be used: [sum of BO of all LCHs restricted to Mode 2 transmission]+[sum of ((BO of the $i^{th}$ M1M2 LCH)*(Mode 2 ratio for the $i^{th}$ M1M2 LCH))].

In the aforementioned formulas, the counter "i" runs from 1 to N, where 'N' is the total number of M1M2 bearers. The BO in PDCP and RLC buffers is calculated using any suitable method. For M1M2 bearers, the UE may use a "ratio" to determine related BO for Mode 1 (e.g., the Mode 1 ratio, and the remaining BO is used to determine the Mode 2 ratio). For example, if the Mode 1 ratio is 40% then 40% data of a corresponding M1M2 bearer will be accounted as BO for Mode 1 and the remaining 60% (e.g., the Mode 2 ratio) data will be accounted as BO for Mode 2, As may be appreciated, the example of 40% for a Mode 1 ratio and 60% for a Mode 2 ratio are just examples. For example, another ratio may be 60% as the Mode 1 ratio and 40% as the Mode 2 ratio. Accordingly, any suitable ratios for Mode 1 and Mode 2 may be used. In certain embodiments, the ratio is determined in the UE using Uu and/or PC5 channel conditions, channel business and/or occupancy of the Mode 1 and/or Mode 2 resource pool, and/or opportunistic scheduling (e.g., a higher portion of the buffer towards a particular mode grant is allocated for a corresponding better channel). In some embodiments, the ratio is preconfigured at the UE, and/or configured at the UE by the network unit 104 (e.g., as part of bearer configuration using RRC signaling).

In some embodiments, a BSR transmitted from the UE may include the full BO of M1M2 LCHs. The network unit 104 may calculate Mode 1 BO and/or Mode 2 BO using the Mode 1 ratio and/or the Mode 2 ratio. The Mode 1 ratio and/or the Mode 2 ratio may either be known at the network unit 104, or the UE may indicate the Mode 1 ratio and/or the Mode 2 ratio to the network unit 104 (e.g., signaled by the UE in the BSR or separately) if the UE determined the Mode 1 ratio and/or the Mode 2 ratio.

In certain embodiments, the Mode 1 ratio and/or the Mode 2 ratio may be determined (or redetermined) by the UE if one of the following occurs: the data in an M1M2 LCH arrives at the L2 buffer (e.g., in PDCP and/or RLC), at a time that a Mode 1 or Mode 2 UL grant is available, or when data available for transmission changes (e.g., compared to a last point in tune at which the Mode 1 ratio and/or the Mode 2 ratio were determined) by a certain (predefined, specified, or configured—by the network unit 104) threshold.

In some embodiments, the UE performs an LCP procedure. For LCP, UE considers for a given mode (e.g., Mode 1 or Mode 2) all the logical channel that are configured to transmit data using this mode. Next, for M1M2 bearers, the UE determines the amount of V2X data to be transmitted using each of the two modes. A "ratio," similar to above BSR calculations, may be used to allocate grants for these bearers for each mode. For example, if the Mode 1 ratio is 40% then 40% data of a corresponding M1M2 bearer will be transmitted via Mode 1 and the remaining 60% (e.g., the Mode 2 ratio) data will be transmitted using Mode 2. So, for performing LCP in for a Mode 1 grant, only 40% of a corresponding M1M2 bearer will be considered and, for a Mode 2 grant, only 60% of a corresponding M1M2 bearer wall be considered, in this example. However, if towards the end of the LCP procedure there are still UL grant resources available for transmission but no other valid data from any of the same or higher priority logical channel is available, then the remaining buffer size of the LCH may be considered for allocation (e.g., padding may be minimized). As may be appreciated, the example of 40% for a Mode 1 ratio and 60% for a Mode 2 ratio are just examples. For example, another ratio may be 60% as the Mode 1 ratio and 40% as the Mode 2 ratio. Accordingly, any suitable ratios for Mode 1 and Mode 2 may be used. In certain embodiments, the ratio is determined in the UE using Uu and/or PC5 channel conditions, channel business and/or occupancy of the Mode 1 and/or Mode 2 resource pool, and/or opportunistic scheduling (e.g., a higher portion of the buffer towards a particular mode grant is allocated for a corresponding better channel). In some embodiments, the ratio is preconfigured at the UE, and/or configured at the UE by the network unit 104 (e.g., as part of bearer configuration using RRC signaling).

In various embodiments, the Mode 1 ratio and/or the Mode 2 ratio may be determined (or redetermined) by the UE if one of the following occurs: the data in an M1M2 LCH arrives at the L2 buffer (e.g., in PDCP and/or RLC), at a time that a Mode 1 or Mode 2 UL grant is available, or when data available for transmission changes (e.g., compared to a last point in time at which the Mode 1 ratio and/or the Mode 2 ratio were determined) by a certain (predefined, specified, or configured—by the network unit 104) threshold.

In certain embodiments, instead of a ratio, a prioritization procedure may used if both Mode 1 and Mode 2 grants are available and it needs to be determined which UL grant resources are used for data transmitted from M1M2 bearers. The prioritization procedure may use one or more of the following prioritization factors for each M1M2 bearers: 1) Mode 1 always: For a particular M1M2 bearer, the network configures that if both Mode 1 and Mode 2 grants are available, only a Mode 1 grant will be considered; 2) Mode 2 always: For a particular M1M2 bearer, the network configures that if both Mode 1 and Mode 2 grants are available, only a Mode 2 grant will be considered; 3) Depending on a priority of a LCH: For a particular M1M2 bearer, if a LCH priority is less than a certain configured (or preconfigured) value, then use Mode 2, otherwise use Mode 1 (or the other way round); 4) Based on PDB: If the remaining packet delay budget (e.g., part or whole of an allowed end to end latency of a corresponding packet) is low then the UE will use a grant for the M1M2 bearer that concludes earlier in time (e.g., the corresponding numerology and/or PUSCH duration allows an earlier delivery to the RN); and/or 5) Based on Reliability: If the required reliability is very high (e.g., 4 nines (99.99%) or 5 nines (99.999%)), then the UE will use the Mode 1 grant, for example. As may be appreciated, one or more of the prioritization factors may be specified. In such embodiments, a configuration or pre-configuration may override a specified prioritization factor for the UE.

In some embodiments, a V2X sidelink communication mode restriction to a LCH is applicable only to an LCP procedure (e.g., first transmission of data). For retransmissions of data (e.g., HARQ retransmissions), the UE may use an UL grant (e.g., Mode 1 or Mode 2) that is: available and/or concludes (as described herein) earlier in time, fulfils the required QoS of the highest priority logical channel in the corresponding MAC TB better (e.g., prefer Mode 1 for a very high reliability requirement).

In various embodiments, a UE uses packet duplication to increase the reliability of the V2X transmissions. The V2X bearers requiring high reliability may be duplicated depending on its corresponding PQI and/or VQI. Once configured for duplication by the RN (e.g., network unit 104) or by the UE itself based on a pre-configuration, the UE considers duplication active until explicitly deactivated by the RN or when a deactivate duplication condition is met. Duplication activation may also be initiated if lower layers in the UE indicate unsuccessful transmission of consecutive "n" PDCP PDUs (or SDUs). If this occurs, the LIE may activate duplication. Furthermore, duplication deactivation may be initiated if lower layers in the UE indicate successful transmission of consecutive "m" PDCP PDUs (or SDUs). If this occurs, the LIE may deactivate duplication. In certain embodiments, duplication activation and/or duplication deactivation may be indicated for a corresponding V2X bearer to the RN using MAC. PDCP, or RRC signaling (e.g., via a MAC CE that is new or was previously used for BSR reporting to carry an explicit indication of duplication activation and/or duplication deactivation). As may be appreciated, the numbers "n" and "m" may be configured (e.g., via signaling to the UE), preconfigured (e.g., via default configuration in a UE), specified, or otherwise implemented in a UE.

In some embodiments, duplication using both Mode 1 and Mode 2 may be performed. In such embodiments, a UE may duplicate V2X data on SL grants received for both Mode 1 and Mode 2.

In various embodiments, duplication using Uu and PC5 (e.g., either or both Mode 1 and Mode 2) may be performed. In such embodiments, the UE uses an UL grant to transmit V2X data to a RN and a Mode 1 or Mode 2 UL grant (e.g., PC5 grant) to transmit the same V2X data directly to one or more receivers. In some embodiments, the V2X data belongs to a V2X bearer configured by the RN for duplication. Upon reception of the V2X data, the RN may transmit the data to an interested receiver, or a group of receivers via unicast, groupcast, or another broadcast manner (e.g., using a suitable RNTI). One embodiment of this is illustrated in FIG. 5.

Figure 5:
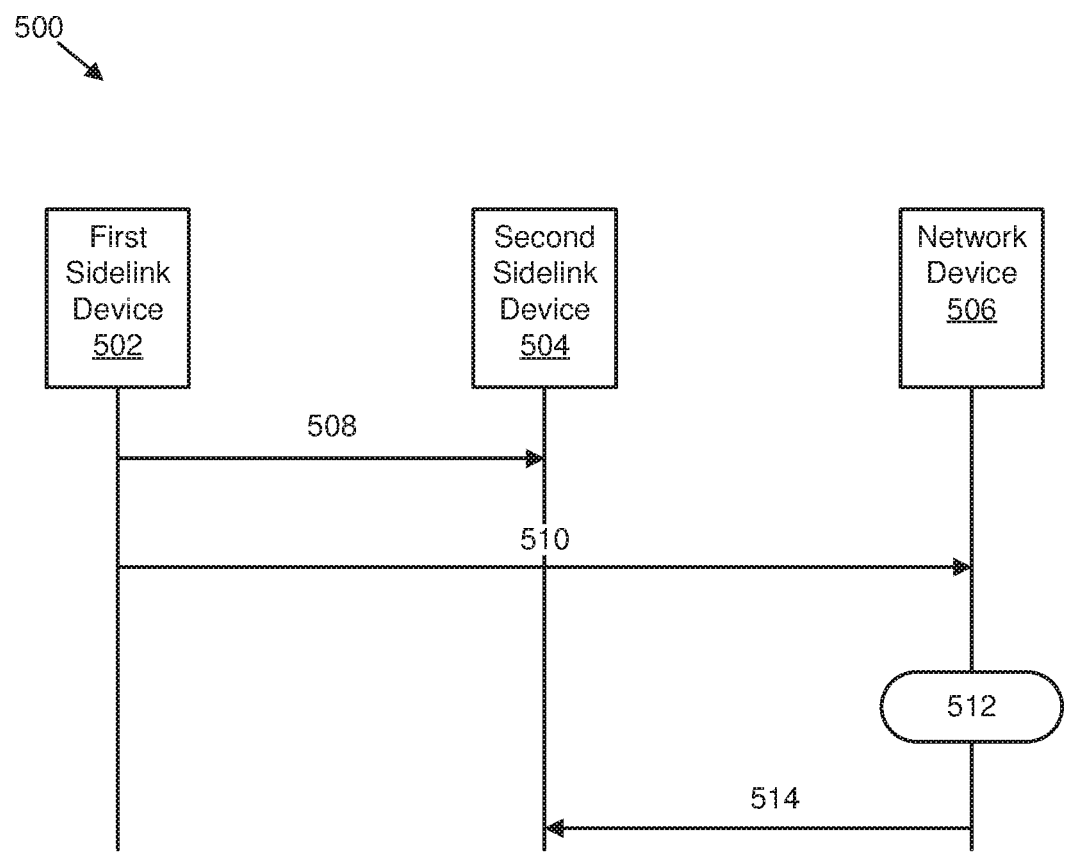
FIG. 5 is a schematic block diagram illustrating one embodiment of communications between devices in a network.

FIG. 5 is a schematic block diagram illustrating one embodiment of communications 500 between devices in a network. The network devices include a first si delink device 502 (e.g., remote unit 102, UE), a second sidelink device 504 (e.g., remote unit 102, UE), and a network device 506 (e.g., network unit 104, gNB). Any of the communications described herein may include one or more messages.

In a first communication 508 transmitted from the first sidelink device 502 to the second sidelink device 504, the first sidelink device 502 transmits V2X data using Mode 1 and/or Mode 2 UL grants to the second sidelink device 504. In a second communication 510 transmitted from the first sidelink device 502 to the network device 506, the first sidelink device 502 transmits V2X data (e.g., a duplicate of the V2X data transmitted during the first communication 508) to the network device 506 via the Uu interface. The network device 506 determines 512 whether duplication is active. If duplication is active, in a third communication 514 transmitted from the network device 506 to the second sidelink device 504, the network device 506 transmits the V2X data (e.g., duplicate data) received from the first sidelink device 502 to the second sidelink device 504. The communications 500 illustrate one embodiment of packet duplication.

Other embodiments of packet duplication may use any combination of duplication legs (e.g., interfaces, channels, resources, or RATs). The following are some examples of pairs of duplication legs in the format of "leg 1-leg2:" Mode 1-Mode 1; Mode 1-Mode 2: Mode 2-Mode 2; Mode 1-V2X on Du of LTE; Mode 2-V2X on Uu of LTE; Mode 1-V2X on Uu of NR; Mode 2-V2X on Uu of NR; V2X on Uu of NR-V2X on Uu of LTE; or any unenumerated combination of the above.

In certain embodiments, duplication is implemented in the PDCP layer of the LIE. If duplication is activated, the PDCP may duplicate the PDCP PDU to more than one linked RLC entity. The MAC entity in the LIE may ensure that the duplicated RLC PDUs are transmitted to either different carriers or on resources (e.g., a resource pool) separate apart enough to facilitate frequency diversity. If the two legs used for duplication end up in two different RATs, the MAC entity handling the duplication may transparently transmit them on different channels and/or RATs.

In various embodiments, the PDCP may use security keys, such as security keys for PC5 security. In such embodiments, the RN may decipher and check for integrity protection of the V2X data of a V2X bearer configured for duplication using security keys applicable for PC5 security of this particular transmitting UE. As may be appreciated, the security keys may be available to a gNB from a V2X server and/or upper layers including Non-Access Stratum and/or directly/indirectly from corresponding V2X application like CAM, DENM, BSM, and so forth.

In certain embodiments, a UE may initiate an RRC connection establishment procedure and request for Mode 1 resources from a RN if a required reliability is very high (e.g. 4 nines (99.99%) or 5 nines (99,999%)) for one or more V2X message received from upper layers. For this purpose, a new RRC connection establishment procedure triggering event (e.g., cause value) may be used. The RN may use this RRC connection establishment procedure triggering event for access control purposes. As may be appreciated, access control parameters for NR V2X Mode 1 may be broadcast in V2X system information. In some embodiments, a UE may perform an access control procedure if the RRC connection request is triggered by Mode 1. The access control procedure may be performed before a RACH procedure and RRC connection request is sent out. In various embodiments, an RRC connection reject procedure may be used. A RN may reject an RRC connection request if there is congestion in resource and/or processing, and send back an RRC connection rejection to the V2X UE. A new RRC connection establishment cause, such as a specific LCID (in MAC) for the CCCH or DCCH message and/or reserved PRACH parameters, may be used to send a request to the RN for establishment of an RRC connection and/or Mode 1 resources. The RN can use the corresponding indication to control the access (allowance or rejection) of such request. After receiving an RRC connection rejection, the UE may use Mode 2 for additional V2X communications.

In certain embodiments, in response to a lack of network coverage (e.g., RLF), a UE may have a new behavior. In such embodiments, the access stratum may inform the upper layers about a possible change in the QoS fulfilment indicating that Uu (e.g., Mode 1) based scheduling is no more available. The upper layers may take actions including terminating one or more existing QoS flows, replacing one or more QoS flows, and/or establishing one or more QoS flow's. The access stratum may then perform a QoS flow to bearer mapping update (e.g., old QoS flows are no more mapped to a bearer and new QoS flow's are mapped to a bearer carrying to packets for a same anchor similar PQI and/or VQI of a particular target L2 destination). The Mode 1 bearers are mapped to Mode 2 based transmission and may use exceptional or normal Mode 2 resource pool preconfigured to the UE, or broadcasted by the current and/or previous serving cell. In some embodiments, Mode 1 bearers are dropped (e.g., if the corresponding QoS flow is dropped by upper layers or just dropped directly in the access stratum).

Figure 6:
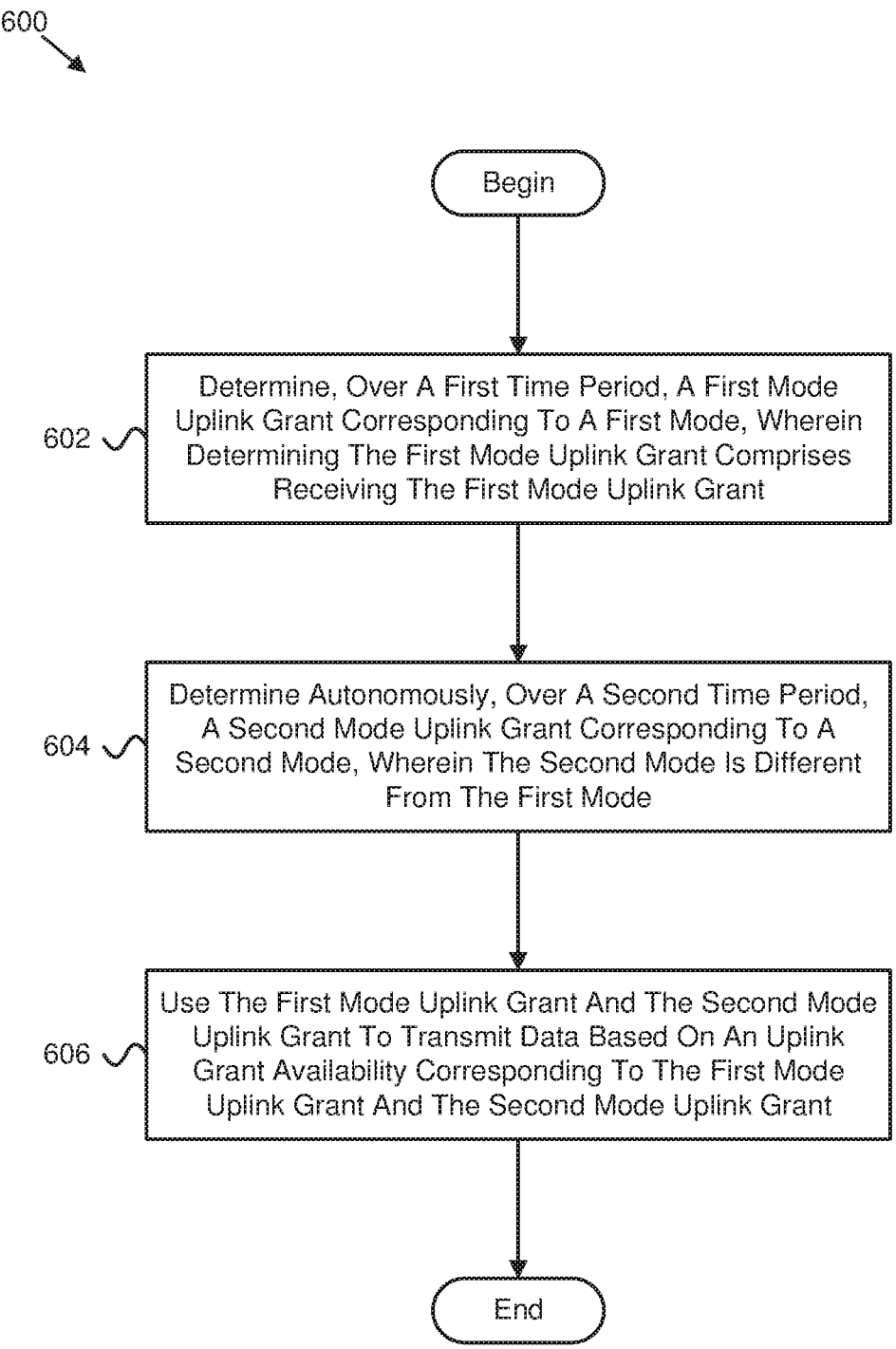
FIG. 6 is a schematic flow chart diagram illustrating another embodiment of a method for determining uplink grants for multiple modes.

FIG. 6 is a schematic flow chart, diagram illustrating another embodiment of a method 600 for determining uplink grants for multiple modes. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include determining 602, over a first time period, a first mode uplink grant corresponding to a first mode. In such an embodiment, determining the first mode uplink grant comprises receiving the first mode uplink grant. In certain embodiments, the method 600 includes determining 604 autonomously, over a second time period, a second mode uplink grant corresponding to a second mode. In such embodiments, the second mode is different from the first mode. In various embodiments, the method 600 includes using 606 the first mode uplink grant and the second mode uplink grant to transmit data based on an uplink grant availability corresponding to the first mode uplink grant and the second mode uplink grant.

In certain embodiments, the second time period overlaps with the first time period. In some embodiments, the method 600 further comprises retransmitting the data using the first mode, the second mode, or a combination thereof based on an earliest available grant time, a quality of service requirement, or a combination thereof. In various embodiments, determining the first mode uplink grant comprises triggering a buffer status report.

In one embodiment, the method 600 further comprises computing the buffer status report based on a buffer occupancy corresponding to at least one logical channel configured to use the first mode. In certain embodiments, the at least one logical channel comprises exclusive logical channels restricted to the first mode. In some embodiments, the at least one logical channel comprises shared logical channels configured to use the first mode and the second mode.

In various embodiments, the buffer occupancy comprises a sum of first buffer occupancies corresponding to the exclusive logical channels and a portion of second buffer occupancies corresponding to the shared logical channels. In one embodiment, the portion of the second buffer occupancies is determined based on a ratio between the first mode and the second mode for each shared logical channel of the shared logical channels. In certain embodiments, the ratio is determined based on a configured ratio, a preconfigured ratio, or a computed ratio. In one computation, the UE may determine a time taken for successful delivery for each Mode 1 and Mode 2 transmission over a certain time period. Then a transmission ratio of the time taken for successful delivery may be used as the determined ratio. For example, if an average time for successful delivery for Mode 1 and Mode 2 is 5 and 10 ms. respectively, then the Mode 1 may be used to transmit double the packet volume (in bytes, for example) compared with the packet volume transmitted using Mode 1. Accordingly, the ratio between Mode 1 and Mode 2 would be 1:2 or 33% to 67%. Another computation of the ratio may rely on channel condition. For example, if a PC5 channel is better than a certain threshold (based using CBR), then it transmits x % of data. Similarly, if Uu. and or a Mode 1 resource pool is better than a certain threshold (for Uu using RSRP/QoS and for Mode 2 resource pool using CBR) then it transmits y % of data. Other computation includes using only one of the modes for a certain V2X data buffer size threshold and then using both modes if the buffer grows, indicating 100% of the BO to the RN, or splitting the BO using the ratio. Changes in buffer data in the buffer of the M1M2 bearer beyond a certain threshold may be used as a new trigger to compute and/or report BSR to RN.

In some embodiments, the ratio is determined based on a configured ratio or a computed ratio. In various embodiments, the computed ratio is computed based on a PC5 channel condition, a Uu channel condition, a PC5 channel latency, a Uu channel latency, an amount of data in a buffer, a comparison between the amount of the data and a threshold, or some combination thereof.

In some embodiments, the first mode uplink grant is available at a first time and the second mode uplink grant is available at a second time, and using the first mode uplink grant and the second mode uplink grant to transmit the data based on the uplink grant availability comprises using the first mode uplink grant if the first time is earlier than the second time or using the second mode uplink grant if the second time is earlier than the first time. In various embodiments, the method 600 further comprises discarding the first mode uplink grant if the second time is earlier than the first time or discarding the second mode uplink grant if the first time is earlier than the second time. In one embodiment, the method 600 further comprises using the first mode uplink grant for a retransmission of the data if the second time is earlier than the first time or using the second mode uplink grant for the retransmission of the data if the first time is earlier than the second time.

In certain embodiments, the method 600 further comprises performing packet duplication by transmitting a duplicate of the data using the first mode, the second mode, a vehicle-to-anything transmission, or some combination thereof. In some embodiments, the method 600 further comprises receiving information indicating to perform the packet duplication. In various embodiments, the method 600 further comprises determining whether to perform the packet duplication.

In one embodiment, the method 600 further comprises, in response to determining to perform the packet duplication, transmitting information indicating the determination to perform the packet duplication, in certain embodiments, the method 600 further comprises initiating a radio resource control connection establishment based on a reliability requirement. In some embodiments, the method 600 further comprises determining a radio link failure.

In various embodiments, the method 600 further comprises modifying quality of service flows based on the radio link failure. In one embodiment, modifying the quality of service flows comprises terminating one or more quality of service flows, establishing one or more quality of service flows, dropping the first mode bearers, or some combination thereof. In certain embodiments, determining the second mode uplink grant comprises randomly selecting resources for the second mode uplink grant. In some embodiments, determining the second mode uplink grant comprises performing a sensing procedure.

In various embodiments, the method 600 further comprises performing a logical channel prioritization procedure based on at least one logical channel configured to use the first mode, the second mode, or a combination thereof to transmit data. In one embodiment, the at least one logical channel comprises shared logical channels configured to use the first mode and the second mode. In certain embodiments, each shared logical channel of the shared logical channels comprises a ratio that indicates a first portion of the logical channel for transmitting data using the first mode and a second portion of the logical channel for transmitting data using the second mode.

In some embodiments, the ratio is determined based on a configured ratio or a computed ratio. In various embodiments, the computed ratio is computed based on a PC5 channel condition, a Uu channel condition, a PC5 channel latency, a Uu channel latency, an amount of data in a buffer, a comparison between the amount of the data and a threshold, or some combination thereof.

In one embodiment, a method comprises: determining, over a first time period, a first mode uplink grant corresponding to a first mode, wherein determining the first mode uplink grant comprises receiving the first mode uplink grant; determining autonomously, over a second time period, a second mode uplink grant corresponding to a second mode, wherein the second mode is different from the first mode; and using the first mode uplink grant and the second mode uplink grant to transmit data based on an uplink grant availability corresponding to the first mode uplink grant and the second mode uplink grant.

In certain embodiments, the second time period overlaps with the first time period.

In some embodiments, the method further comprises retransmitting the data using the first mode, the second mode, or a combination thereof based on an earliest available grant time, a quality of service requirement, or a combination thereof.

In various embodiments, determining the first mode uplink grant comprises triggering a buffer status report.

In one embodiment, the method further comprises computing the buffer status report based on a buffer occupancy corresponding to at least one logical channel configured to use the first mode.

In certain embodiments, the at least one logical channel comprises exclusive logical channels restricted to the first mode.

In some embodiments, the at least one logical channel comprises shared logical channels configured to use the first mode and the second mode.

In various embodiments, the buffer occupancy comprises a sum of first buffer occupancies corresponding to the exclusive logical channels and a portion of second buffer occupancies corresponding to the shared logical channels.

In one embodiment, the portion of the second buffer occupancies is determined based on a ratio between the first mode and the second mode for each shared logical channel of the shared logical channels.

In certain embodiments, the ratio is determined based on a configured ratio or a computed ratio.

In various embodiments, the computed ratio is computed based on a PC5 channel condition, a Uu channel condition, a PC5 channel latency, a Uu channel latency, an amount of data in a buffer, a comparison between the amount of the data and a threshold, or some combination thereof.

In some embodiments, the first mode uplink grant is available at a first time and the second mode uplink grant is available at a second time, and using the first mode uplink grant and the second mode uplink grant to transmit the data based on the uplink grain availability comprises using the first mode uplink grant if the first time is earlier than the second time or using the second mode uplink grant if the second time is earlier than the first time.

In various embodiments, the method further comprises discarding the first mode uplink grant if the second time is earlier than the first time or discarding the second mode uplink grant if the first time is earlier than the second time.

In one embodiment, the method further comprises using the first mode uplink grant for a retransmission of the data if the second time is earlier than the first time or using the second mode uplink grant for the retransmission of the data if the first time is earlier than the second time.

In certain embodiments, the method further comprises performing packet duplication by transmitting a duplicate of the data using the first mode, the second mode, a vehicle-to-anything transmission, or some combination thereof.

In some embodiments, the method further comprises receiving information indicating to perform the packet duplication.

In various embodiments, the method further comprises determining whether to perform the packet duplication.

In one embodiment, the method further comprises, in response to determining to perform the packet duplication, transmitting information indicating the determination to perform the packet duplication.

In certain embodiments, the method further comprises initiating a radio resource control connection establishment based on a reliability requirement.

In some embodiments, the method further comprises determining a radio link failure.

In various embodiments, the method further comprises modifying quality of service flows based on the radio link failure.

In one embodiment, modifying the quality of service flows comprises terminating one or more quality of service flows, establishing one or more quality of service flows, dropping the first mode bearers, or some combination thereof.

In certain embodiments, determining the second mode uplink grant comprises randomly selecting resources for the second mode uplink grant.

In some embodiments, determining the second mode uplink grant comprises performing a sensing procedure.

In various embodiments, the method further comprises performing a logical channel prioritization procedure based on at least one logical channel configured to use the first mode, the second mode, or a combination thereof to transmit data.

In one embodiment, the at least one logical channel comprises shared logical channels configured to use the first mode and the second mode.

In certain embodiments, each shared logical channel of the shared logical channels comprises a ratio that indicates a first portion of the logical channel for transmitting data using the first mode and a second portion of the logical channel for transmitting data using the second mode.

In some embodiments, the ratio is determined based on a configured ratio or a computed ratio.

In various embodiments, the computed ratio is computed based on a PC5 channel condition, a Uu channel condition, a PC5 channel latency, a Uu channel latency, an amount of data in a buffer, a comparison between the amount of the data and a threshold, or some combination thereof.

In one embodiment, a method comprises: determining, over a first time period, a first mode uplink grant corresponding to a first mode, wherein determining the first mode uplink grant comprises receiving the first mode uplink grant; determining autonomously, over a second time period, a second mode uplink grant corresponding to a second mode, wherein the second mode is different from the first mode; and using the first mode uplink grant and the second mode uplink grant to transmit data based on a prioritization that indicates which of the first mode uplink grant and the second mode uplink grant to use for a bearer configured to use the first mode and the second mode.

In certain embodiments, the prioritization is determined based on the first mode always having priority, the second mode always having priority, a priority value assigned to the bearer, a packet delay budget, a reliability, or some combination thereof.

In some embodiments, the first mode uplink grant overlaps in time with the second mode uplink grant.

In one embodiment, an apparatus comprises: a processor that: determines, over a first time period, a first mode uplink grant corresponding to a first mode, wherein determining the first mode uplink grant comprises receiving the first mode uplink grant; and determines autonomously, over a second time period, a second mode uplink grant corresponding to a second mode, wherein the second mode is different from the first mode; and a transmitter that uses the first mode uplink grant and the second mode uplink grant to transmit data based on an uplink grant availability corresponding to the first mode uplink grant and the second mode uplink grant.

In certain embodiments, the second time period overlaps with the first time period.

In some embodiments, the transmitter retransmitting the data using the first mode, the second mode, or a combination thereof based on an earliest available grant time, a quality of service requirement, or a combination thereof.

In various embodiments, the processor determines the first mode uplink grant by triggering a buffer status report.

In one embodiment, the processor computes the buffer status report based on a buffer occupancy corresponding to at least one logical channel configured to use the first mode.

In certain embodiments, the at least one logical channel comprises exclusive logical channels restricted to the first mode.

In some embodiments, the at least one logical channel comprises shared logical channels configured to use the first mode and the second mode.

In various embodiments, the buffer occupancy comprises a sum of first buffer occupancies corresponding to the exclusive logical channels and a portion of second buffer occupancies corresponding to the shared logical channels.

In one embodiment, the portion of the second buffer occupancies is determined based on a ratio between the first mode and the second mode for each shared logical channel of the shared logical channels.

In certain embodiments, the ratio is determined based on a configured ratio or a computed ratio.

In one embodiment, the computed ratio is computed based on a PC5 channel condition, a Uu channel condition, a PC5 channel latency, a Uu channel latency, an amount of data in a buffer, a comparison between the amount of the data and a threshold, or some combination thereof.

In some embodiments, the first mode uplink grant is available at a first time and the second mode uplink grant is available at a second time, and the transmitter using the first mode uplink grant and the second mode uplink grant to transmit the data based on the uplink grant availability comprises using the first mode uplink grant if the first time is earlier than the second time or using the second mode uplink grant if the second time is earlier than the first time.

In various embodiments, the processor discards the first mode uplink grant if the second time is earlier than the first time or discarding the second mode uplink grant if the first time is earlier than the second time.

In one embodiment, the transmitter uses the first mode uplink grant for a retransmission of the data if the second time is earlier than the first time or uses the second mode uplink grant for the retransmission of the data if the first time is earlier than the second time.

In certain embodiments, the processor performs packet duplication by transmitting a duplicate of the data using the first mode, the second mode, a vehicle-to-anything transmission, or some combination thereof.

In some embodiments, the apparatus further comprises a receiver that receives information indicating to perform the packet duplication.

In various embodiments, the processor determines whether to perform the packet duplication.

In one embodiment, in response to determining to perform the packet duplication, the transmitter transmits information indicating the determination to perform the packet duplication.

In certain embodiments, the processor initiates a radio resource control connection establishment based on a reliability requirement.

In some embodiments, the processor determines a radio link failure.

In various embodiments, the processor modifies quality of service flows based on the radio link failure.

In one embodiment, the processor modifying the quality of service flows comprises the processor terminating one or more quality of service flows, establishing one or more quality of service flows, dropping the first mode bearers, or some combination thereof.

In certain embodiments, the processor determining the second mode uplink grant comprises the processor randomly selecting resources for the second mode uplink grant.

In some embodiments, the processor determining the second mode uplink grant comprises the processor performing a sensing procedure.

In various embodiments, the processor performs a logical channel prioritization procedure based on at least one logical channel configured to use the first mode, the second mode, or a combination thereof to transmit data.

In one embodiment, the at least one logical channel comprises shared logical channels configured to use the first mode and the second mode.

In certain embodiments, each shared logical channel of the shared logical channels comprises a ratio that indicates a first portion of the logical channel for transmitting data using the first mode and a second portion of the logical channel for transmitting data using the second mode.

In some embodiments, the ratio is determined based on a configured ratio or a computed ratio.

In various embodiments, the computed ratio is computed based on a PC5 channel condition, a Uu channel condition, a PC5 channel latency, a Uu channel latency, an amount of data in a buffer, a comparison between the amount of the data and a threshold, or some combination thereof.

In one embodiments, an apparatus comprises: a processor that: determines, over a first time period, a first mode uplink grant corresponding to a first mode, wherein determining the first mode uplink grant comprises receiving the first mode uplink grant; and determines autonomously, over a second time period, a second mode uplink grant corresponding to a second mode, wherein the second mode is different from the first mode; and a transmitter that uses the first mode uplink grant and the second mode uplink grant to transmit data based on a prioritization that indicates which of the first mode uplink grant and the second mode uplink grant to use for a bearer configured to use the first mode and the second mode.

In certain embodiments, the prioritization is determined based on the first mode always having priority, the second mode always having priority, a priority value assigned to the bearer, a packet delay budget, a reliability, or some combination thereof.

In some embodiments, the first mode uplink grant overlaps in time with the second mode uplink grant.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   determining, over a first time period, a first mode uplink grant for transmission of a data packet corresponding to a first mode, wherein determining the first mode uplink grant comprises receiving the first mode uplink grant;
   determining autonomously, over a second time period, a second mode uplink grant for transmission of the data packet corresponding to a second mode, wherein the second mode is different from the first mode; and
   using the first mode uplink grant and the second mode uplink grant to transmit the data packet based on an uplink grant availability corresponding to the first mode uplink grant and the second mode uplink grant, wherein the first mode uplink grant is used in response to first time resources for the first mode uplink grant occurring prior to second time resources for the second mode uplink grant, and the second mode uplink grant is used in response to the second time resources for the second mode uplink grant occurring prior to the first time resources for the first mode uplink grant.

2. The method of claim 1, wherein the second time period overlaps with the first time period.

3. The method of claim 1, further comprising retransmitting the data using the first mode, the second mode, or a combination thereof based on an earliest available grant time, a quality of service requirement, or a combination thereof.

4. The method of claim 1, wherein determining the first mode uplink grant comprises triggering a buffer status report.

5. The method of claim 4, further comprising computing the buffer status report based on a buffer occupancy corresponding to at least one logical channel configured to use the first mode.

6. The method of claim 5, wherein the at least one logical channel comprises exclusive logical channels restricted to the first mode.

7. The method of claim 6, wherein the at least one logical channel comprises shared logical channels configured to use the first mode and the second mode.

8. The method of claim 1, further comprising performing packet duplication by transmitting a duplicate of the data using the first mode, the second mode, a vehicle-to-anything transmission, or some combination thereof.

9. The method of claim 1, further comprising performing a logical channel prioritization procedure based on at least one logical channel configured to use the first mode, the second mode, or a combination thereof to transmit data.

10. The method of claim 9, wherein the at least one logical channel comprises shared logical channels configured to use the first mode and the second mode.

11. A method comprising:
    determining, over a first time period, a first mode uplink grant for transmission of a data packet corresponding to a first mode, wherein determining the first mode uplink grant comprises receiving the first mode uplink grant;
    determining autonomously, over a second time period, a second mode uplink grant for transmission of the data packet corresponding to a second mode, wherein the second mode is different from the first mode; and
    using the first mode uplink grant and the second mode uplink grant to transmit the data packet based on a prioritization that indicates which of the first mode uplink grant and the second mode uplink grant to use for a bearer configured to use the first mode and the second mode, wherein the first mode uplink grant is used in response to a first priority for the first mode uplink grant being greater than a second priority for the second mode uplink grant, and the second mode uplink grant is used in response to the second priority for the second mode uplink grant being greater than the first priority for the first mode uplink grant.

12. An apparatus comprising:
    a processor that:
       determines, over a first time period, a first mode uplink grant for transmission of a data packet corresponding to a first mode, wherein determining the first mode uplink grant comprises receiving the first mode uplink grant; and
       determines autonomously, over a second time period, a second mode uplink grant for transmission of the data packet corresponding to a second mode, wherein the second mode is different from the first mode; and
    a transmitter that uses the first mode uplink grant and the second mode uplink grant to transmit the data packet based on an uplink grant availability corresponding to the first mode uplink grant and the second mode uplink grant, wherein the first mode uplink grant is used in response to first time resources for the first mode uplink grant occurring prior to second time resources for the second mode uplink grant, and the second mode uplink grant is used in response to the second time resources for the second mode uplink grant occurring prior to the first time resources for the first mode uplink grant.

13. The apparatus of claim 12, wherein the second time period overlaps with the first time period.

14. The apparatus of claim 12, wherein the transmitter retransmits the data using the first mode, the second mode, or a combination thereof based on an earliest available grant time, a quality of service requirement, or a combination thereof.

15. The apparatus of claim 12, wherein the processor computes a buffer status report based on a buffer occupancy corresponding to at least one logical channel configured to use the first mode.

16. The apparatus of claim 15, wherein the at least one logical channel comprises exclusive logical channels restricted to the first mode.

17. The apparatus of claim 16, wherein the at least one logical channel comprises shared logical channels configured to use the first mode and the second mode.

18. The apparatus of claim 12, wherein the processor performs packet duplication by transmitting a duplicate of the data using the first mode, the second mode, a vehicle-to-anything transmission, or some combination thereof.

19. The apparatus of claim 12, wherein the processor performs a logical channel prioritization procedure based on at least one logical channel configured to use the first mode, the second mode, or a combination thereof to transmit data.

20. The apparatus of claim 19, wherein the at least one logical channel comprises shared logical channels configured to use the first mode and the second mode.

* * * * *